United States Patent [19]

Sawyer

[11] Patent Number: 6,097,937
[45] Date of Patent: Aug. 1, 2000

[54] SYSTEM AND METHOD OF IMPLEMENTING A PRIVATE CHARGE RATE IN A RADIO TELECOMMUNICATIONS NETWORK

[75] Inventor: Francois Sawyer, St-Hubert, Canada

[73] Assignee: Telefonaktiebolaget LM Ericsson (publ), Stockholm, Sweden

[21] Appl. No.: 09/135,237

[22] Filed: Aug. 17, 1998

[51] Int. Cl.[7] .................................................. H04M 11/00
[52] U.S. Cl. ........................... 455/406; 455/424; 455/433
[58] Field of Search ...................................... 455/406, 408, 455/422, 432, 434, 435, 436, 67.3, 405, 433, 423, 424; 370/241, 242, 243

[56] References Cited

U.S. PATENT DOCUMENTS

| | | | |
|---|---|---|---|
| 4,247,908 | 1/1981 | Lockhart, Jr. et al. | 709/245 |
| 4,415,770 | 11/1983 | Kai et al. | 379/32 |
| 5,291,543 | 3/1994 | Freese et al. | 379/59 |
| 5,345,502 | 9/1994 | Rothenhöfer | 379/207 |
| 5,499,386 | 3/1996 | Karlsson | 455/33.2 |
| 5,504,803 | 4/1996 | Yamada et al. | 379/59 |
| 5,640,677 | 6/1997 | Karlsson | 455/33.2 |
| 5,754,955 | 5/1998 | Ekbatani | 455/422 |
| 5,802,468 | 9/1998 | Gallant et al. | 455/422 |
| 5,923,741 | 7/1999 | Wright et al. | 379/114 |
| 5,943,332 | 8/1999 | Liu et al. | 370/342 |
| 5,950,125 | 9/1999 | Buhrmann et al. | 455/422 |

FOREIGN PATENT DOCUMENTS

| | | |
|---|---|---|
| 2 296 631 | 3/1996 | United Kingdom . |
| WO 97/34437 | 9/1997 | WIPO . |

Primary Examiner—Fan Tsang
Assistant Examiner—Blane J. Jackson
Attorney, Agent, or Firm—Smith & Danamraj, PC

[57] ABSTRACT

A system and method for determining a charge rate for a call from a mobile station in a cellular telecommunications network in which a public system operates a macrocell which overlays a microcell operated by a private system. The private system reports whether it is operating normally to a mobile switching center (MSC) in the public system. The MSC sends a charging record to a billing center and includes a private system status indication (PSSI) which indicates whether the private system is operating normally. The charging record also includes an identity of the mobile station (MSID) and an identity of the cell where the call is placed (CELLID). The billing center determines from the MSID whether the mobile station belongs to the private system, determines from the CELLID which cell the call was placed in, and determines from the PSSI whether the private system is operating normally. The call is charged at the preferential rate upon determining that the mobile station belongs to the private system, the call was placed in the public macrocell, and the private system is not operating normally.

14 Claims, 3 Drawing Sheets

FIG.3

| CHARGING RECORD SUBSET |
|---|
| Record Type |
| Call Status |
| Record Sequence Number |
| Call Identification Number |
| Calling Party Identification ( MSID ) |
| Called Party Identification |
| Date for Start of Charging |
| Time for Start of Charging |
| Chargeable Duration |
| Originating Cell ( CELLID ) |
| Outgoing Route |
| Incoming Route |
| Number of Handoffs Performed |
| Number of Intersystem Handoffs |
| Tariff Class |
| Exchange Identity |
| Billing ID |
| Private System Status Indication ( PSSI ) |
| . . . |

SYSTEM AND METHOD OF IMPLEMENTING A PRIVATE CHARGE RATE IN A RADIO TELECOMMUNICATIONS NETWORK

BACKGROUND OF THE INVENTION

1. Technical Field of the Invention

This invention relates to telecommunication systems and, more particularly, to a method of implementing a private charge rate in a cellular radio telecommunications network.

2. Description of Related Art

Multi-level layered cellular radio architectures are known in the art and are utilized to increase capacity in the cellular network, especially in densely populated urban areas. In these hierarchical networks, microcells and picocells share capacity in areas also covered by larger macrocells. Server selection and handoff decisions can be quite complex in these networks, and U.S. Pat. Nos. 5,499,386 and 5,640,677 to Karlsson disclose a method of best server selection in which a decision as to the best serving cell for a mobile station is made based upon a preference value assigned to each cell and the signal strength with the mobile station. Microcells and picocells are preferred in this method since they add capacity to the network. For purposes of this disclosure, the term "microcell" is construed as including picocells as well.

In an office building, the owner may install a private wireless office system which may include a plurality of microcells providing cellular coverage for private subscribers within the office building. Nearby, there may be a base station for a macrocell which provides public coverage of an area which includes the office building. Signals from outside the office building (for example, from the nearby macrocell base station) penetrate the building, and it is possible for a MS within the building to access the Public Land Mobile Network (PLMN) through the macrocell. MSs that belong to the private system are programmed with a private system identification number that links them to the private system. Therefore, when the MSs attempt to access wireless service from within the building, they automatically select one of the microcells within the private system. The difference from the regular hierarchical cell structure described by Karlsson is that the private microcell is preferred only for the subscribers of that private system.

Typically, the owner of the private system may pay a monthly flat fee to the public operator for system access, or may pay a preferential rate known as a private charge rate. Following a call by a private subscriber, the mobile station identity (MSID) as well as the identity of the private cell (CELLID) is placed in the charging record to ensure that the call is billed at the preferential rate. Additionally, if only a portion of the call is conducted in the private cell, then that portion of the call is billed at the preferential rate, and the remaining portion is billed at the public rate. For purposes of this disclosure, reference to a call placed in a private cell also refers to the portion of the call conducted in a MS's private cell when the call spans several cells, one of with is the MS's private cell.

If the private system fUils, the private subscriber's calls are handled by the public system rather than the private system. If so, the subscriber may think his calls are free, or at the preferential rate, when they are not. MSs that belong to the private system typically provide an indication to the subscriber of whether the MS is operating on the private system or the public system. However, the subscriber may not notice which system is indicated, and may continue to place and receive calls. Even if the subscriber notices the indication that the MS is operating on the public system, the subscriber's only choices are to pay the higher public rate, or delay his calls until the private system is operating again. Private cellular systems may have less capable operation and maintenance (O&M) systems and less redundancy than the public system, and therefore may take longer to repair when they fail. Thus, this situation can be a major problem for private subscribers.

There are no known prior art teachings of a solution to the aforementioned deficiency and shortcoming such as that disclosed herein. The prior art describes how to implement a private system, but does not teach or suggest a method of charging for the calls which overcomes the above problem. In particular, PCT Patent Application WO 97/34437 to Widegren discloses a system allowing roaming between a wireless office system and the PLMN. However, Widegren does not teach or suggest a method of charging for calls in which a private subscriber can avoid being charged a higher public rate when the private system fails.

SUMMARY OF THE INVENTION

The present invention is a method of ensuring that a private system subscriber is charged a preferential rate when originating or answering calls within the cell of the private system. The method identifies the cell of the private system as a preferred cell. Calls to or from MSs in the preferred cell are charged the preferential rate when the private system is fully operational. If the preferred cell is currently not operable, then the call is handled by a non-preferred cell, and an indication that the preferred cell is not operable is placed in the charging record. In response to the indication that the preferred cell is not operable, the billing center charges the call at the preferential rate.

In another aspect, the present invention is a method of charging for a call from a mobile station which belongs to a private cellular system when degraded performance of the private system prevents the mobile station from accessing the private system. The private system operates a microcell which is overlaid by a macrocell in a public cellular system. The method comprises the steps of reporting to the public system that performance of the private system is degraded, determining that the mobile station placed a call in the public macrocell, and charging for the call at a preferential rate charged for calls in the private system.

In yet another aspect, the present invention is a method of determining a charge rate for a call from a mobile station in a cellular telecommunications network in which a public system operates a macrocell which overlays a microcell operated by a private system. The method begins by reporting to a mobile switching center (MSC) in the public system, whether the private system is operating normally; and placing a private system status indication (PSSI) in a charging record generated by the MSC, the PSSI indicating whether the private system is operating normally. The charging record also includes an identity of the mobile station (MSID) and an identity of a cell where the call is placed (CELLID). The method continues by sending the charging record from the MSC to a billing center, determining whether the mobile station belongs to the private system, determining which cell the call was placed in upon determining that the mobile station belongs to the private system, determining whether the private system is operating normally upon determining that the call was placed in the public system macrocell, and charging the call at the preferential rate upon determining that the private system is not operating normally.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 3 is a table which illustrates a subset of the information included in the modified charging record of the present invention.

DETAILED DESCRIPTION OF EMBODIMENTS

Typically, a mobile call may span several mobile switching centers (MSCs), and charging records are generated in each MSC (and its adjunct processor) which participated in processing the call. Billing ID numbers are placed in the charging records by each MSC, and the records are sent to a billing center. The billing center correlates which charging records are associated with each call through the use of the billing ID numbers. Although multiple MSCs may be involved in the processing of a call, for exemplary purposes, only one such MSC 11 is illustrated in FIG. 1.

Figure 1:
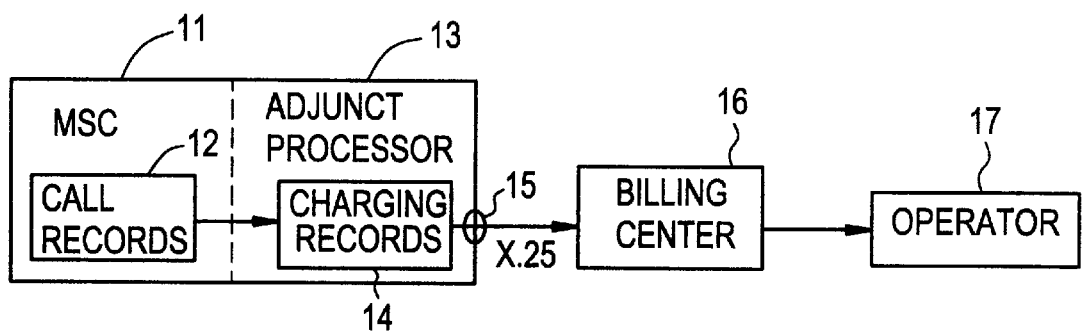
FIG. 1 (Prior Art) is a simplified block diagram illustrating the existing system for collecting charging records in cellular radio telecommunications networks.

FIG. 1 is a simplified block diagram illustrating the existing system for collecting charging records in cellular radio telecommunications networks. When a call is completed, the call records 12 in the MSC 11 are sent to an adjunct processor 13 where they are utilized to create charging records 14. The charging records may include such information as the identity of the calling party, the identity of the called party, date and time when the call was placed, the duration of the call, the identity of the cell or cells where the call was handled, the number of handoffs, and whether there was a handoff from one system to another system during the call. The exact contents of the charging records are defined in ANSI-124 Wireless Radio Telecommunication Intersystem Non-Signaling Data Communication DMH (Data Message Handler) specifications, the latest version of which is ANSI-124B Ballot Version dated Apr. 22, 1998, which is hereby incorporated by reference herein as if quoted in its entirety. ANSI-124B describes the procedures and messages necessary to provide to wireless service providers, non-signaling data communications requiring interaction between different wireless systems. The ANSI-124B standard is complementary to the ANSI-41 Cellular Radiotelecommunications Intersystem Operations standard which is also incorporated by reference herein as if quoted in its entirety.

Traditionally, charging records have been put on magnetic tape or hard disks and manually shipped to an external billing center 16. In the present invention, the charging records may be shipped in this manner, but are preferably transferred via an X.25 port 15 to the external billing center 16 for post processing. Once in the billing center, the charging records are processed, and billing information is generated and sent to the respective operator(s) 17. The billing information is then utilized to settle accounts between operators for automatic roaming services and to bill individual subscribers.

Figure 2:
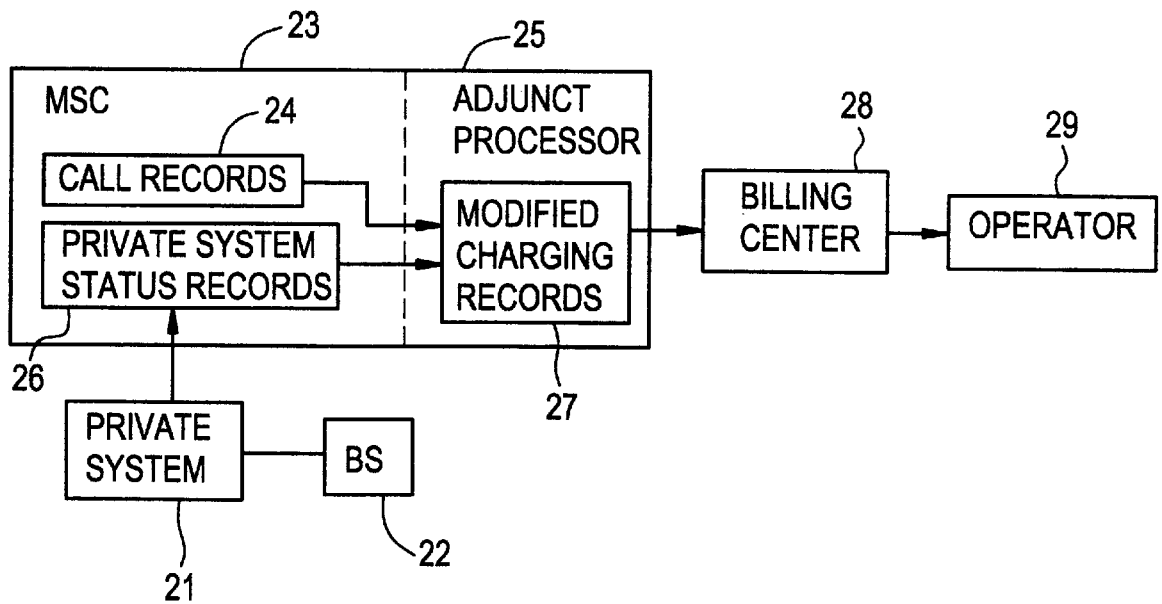
FIG. 2 is a simplified block diagram illustrating a system for collecting charging records in the preferred embodiment of the present invention when a private cellular radio telecommunications network is connected to a public cellular radio telecommunications network.

FIG. 2 is a simplified block diagram illustrating a system for collecting charging records in the preferred embodiment of the present invention when a private cellular system 21 is connected to a public cellular system. The present invention interfaces between the public system and the private system to give private subscribers preferential status in the public system if the private system becomes degraded or fails. The present invention places additional information in the charging record when a MS makes a call. In addition to the MSID and the CELLID, a private system status indication (PSSI) is added which indicates the number of private systems within the public cell's service area, and the status of each private system (i.e., an indication of which private systems are operating normally, congested, degraded, or inoperative). By matching the MSID, the CELLID, and the PSSI, the billing center determines whether the call is being placed by a private subscriber, whether the call is placed in the private system microcell or an overlying public system macrocell, and whether the private system is currently inoperative or degraded. From these determinations, the billing center determines and applies the correct rate to the call.

Referring still to FIG. 2, a private system 21 having at least one base station 22 is connected to a public MSC 23. The MSC collects call records 24 and sends them to an adjunct processor 25. The private system reports to the MSC if its operation becomes degraded due, for example, to private switch failure, congestion, or failure of one of its base stations. The MSC collects private system status records 26 and sends them to the adjunct processor. The adjunct processor creates modified charging records 27 by adding the PSSI to the charging records. The modified charging records are then sent to the billing center 28 which determines whether to apply the preferential rate to the call before sending the billing record to the system operator 29.

A "private system" may be construed as either a single private microcell connected to a public MSC, a group of private microcells connected to a public MSC, or a group of private microcells connected to a private MSC. The present invention utilizes the tools of the hierarchical cell structure disclosed in U.S. Pat. Nos. 5,499,386 and 5,640,677 to Karlsson to associate microcells from the private system with macrocells of the public system. U.S. Pat. Nos. 5,499,386 and 5,640,677 are hereby incorporated by reference herein as if quoted in their entirety. If the public macrocell and the private microcell are connected to the same MSC, then the information about the status of each cell is internal to the MSC software. The MSC then generates the modified charging record and sends it to the billing center.

If distinct MSCs are utilized for the private system and the public system, then additional signaling is required between the MSCs to provide current information on the status of each cell. A message is sent from the private system to the MSC for the public cell indicating that the performance of the private system is degraded. The message may be sent by IS-41 extension, X.25 datalink, Transaction Control Part/Internet Protocol (TCP/IP), etc., although an extension of IS-41 is preferred. The public system MSC then places the new information in the charging record.

If the private system is totally inoperative, however, it may not be able to send the message. In addition, because of the lack of redundancy in some private systems, they may periodically be off the air for maintenance purposes. A periodic signal referred to as a "heartbeat" may be sent regularly (for example, once per minute) from the private MSC to the public MSC to constantly update the public MSC on the status of the private MSC. Failure to receive one or more heartbeat signals as planned is then an indication that the private system is experiencing difficulties. The public MSC then updates the PSSI for the private system to indicate the degraded or inoperative status of the private system.

If the heartbeat signal is not utilized, the private system may send a message to the public system after operation of the private system is restored. The message identifies the period of time that the private system was inoperative, and the preferential tariff is then applied retroactively by the billing center to calls made by private subscribers during that time period.

FIG. 3 is a table which illustrates a subset of the information included in the modified charging record of the present invention. As illustrated, the modified charging record includes the PSSI 31 in addition to the MSID 32, the CELLID 33, and other data required by the billing center to properly compute and allocate the charge for a call.

Figure 4:
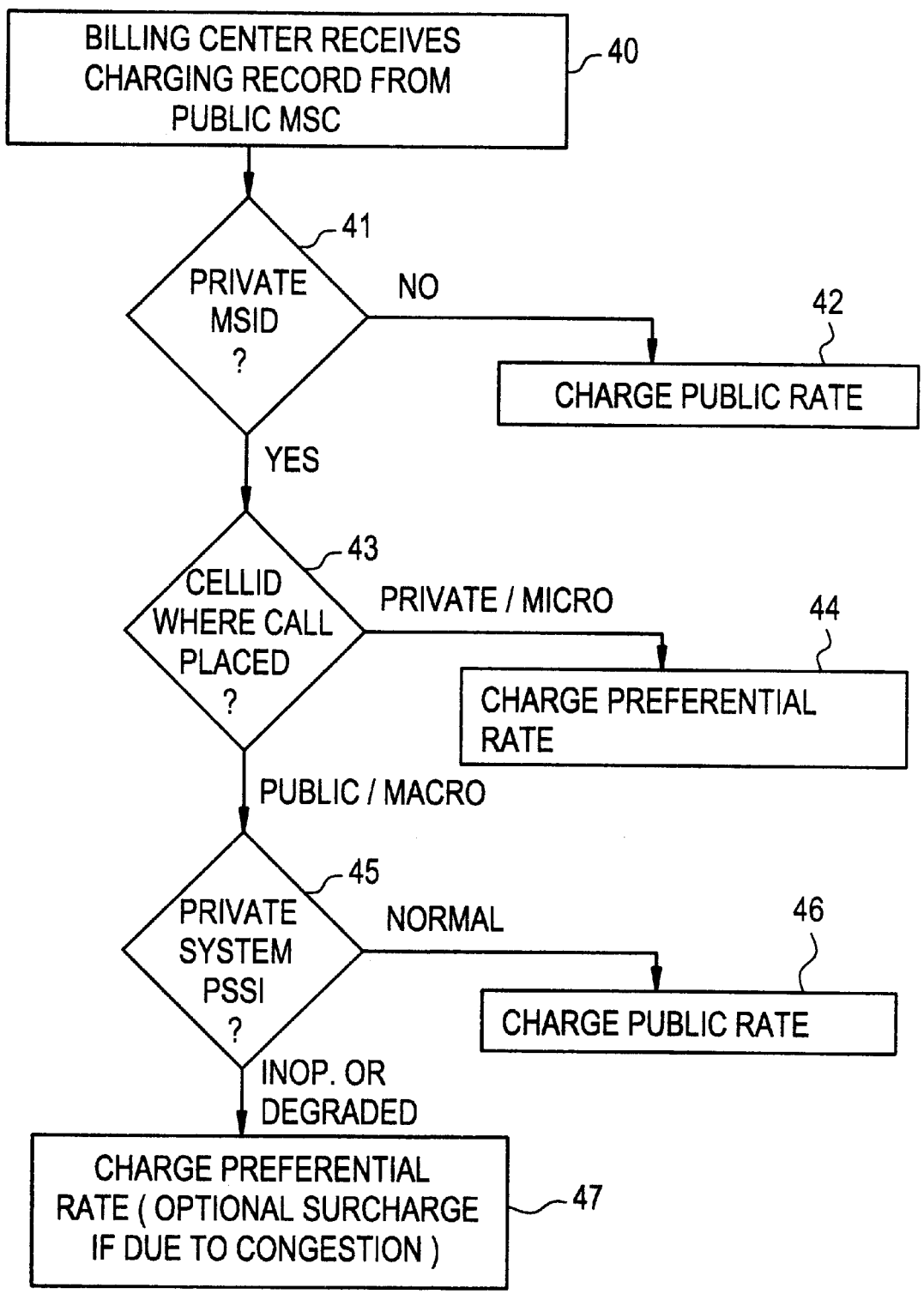
FIG. 4 is a flow chart of the steps performed by the billing center when determining the billing rate for a call in accordance with the teachings of the present invention.

FIG. 4 is a flow chart of the steps performed by the billing center 28 in the method of the present invention when determining the billing rate for a call. At step 40, a charging record is received in the billing center from the public MSC 23. At step 41, the MSID in the charging record is checked against a table of MSs belonging to a private system to determine whether the originating mobile station belongs to a private system. If not, the method moves to step 42 where the call is charged at the normal public rate. If the mobile station belongs to a private system, the billing center checks the CELLID in the charging record at step 43 to determine which cell the call was placed in. If the call was placed in the private system microcell, the method moves to step 44 where the call is charged at the preferential private rate. However, if the call was placed in the public system macrocell which overlays the private microcell, there are several possible explanations. It may be that there is no private system within the coverage area of the public macrocell. Alternatively, there may be a private system, but it is a different one from the private system which the MS is allowed to access. Still yet, the private system to which the MS belongs may be degraded or inoperative. Therefore, the method moves to step 45 where the billing center checks the PSSI in the charging record to determine the number of private systems within the coverage area of the macrocell and the status of each private system. If the MS's private system is operating normally, this indicates that the mobile station is operating outside the area of its private system. Therefore, the method moves to step 46 where the call is charged at the normal public rate. However, if the PSSI indicates that the MS's private system is not operating normally (i.e., the private system is inoperative or degraded), then the method moves to step 47 where the call is charged at the preferential private rate.

It should be noted that if the degradation in performance is due to congestion in the private system, then the private system may be under-dimensioned for its intended traffic load. The public system operator may choose to apply a surcharge to such "spill-over" calls which raises the effective rate to a level somewhat less than the public rate. Alternatively, the operator may choose to apply the public rate to spill-over calls as an incentive for the private operator to properly dimension the private system.

The present invention provides the operator with charging data that provide the operator with options on how to charge for access to the public system by MSs that belong to private systems. The operator may have different agreements with the owners of different private systems that may, for example, charge a preferential rate when the public access is due to a private system failure, add a surcharge on the preferential rate when the public access is due to private system congestion, or charge the public rate whenever the public system is accessed for specified or unspecified reasons.

It is thus believed hat the operation and construction of the present invention will be apparent from the foregoing description. While the system and method shown and described has been characterized as being preferred, it will be readily apparent that various changes and modifications could be made therein without departing from the spirit and scope of the invention as defined in the following claims.

What is claimed is:

1. A method of determining a charge rate for a call from a mobile station in a cellular telecommunications network in which a public system operates a macrocell which overlays a microcell operated by a private system, said method comprising the steps of:

regularly sending a periodic signal from the private system to a mobile switching center (MSC) in the public system, said periodic signal indicating whether the private system is operating normally;

placing a private system status indication (PSSI) in a charging record generated by the MSC, said PSSI indicating whether the private system is operating normally;

placing an identity of the mobile station (MSID) and an identity of a cell where the call is placed (CELLID) in the charging record by the MSC;

sending the charging record from the MSC to a billing center;

determining from the MSID whether the mobile station belongs to the private system;

determining from the PSSI whether the private system is operating normally;

determining from the CELLID whether the call was placed in the overlying public system macrocell; and charging the call at a preferential rate upon determining that the MS belongs to the private system, the private system is not operating normally, and the call was placed in the overlying public system macrocell.

2. The method of determining a charge rate of claim 1 further comprising, after the step of determining whether the mobile station belongs to the private system, the step of charging the call at a public rate upon determining that the mobile station does not belong to the private system.

3. The method of determining a charge rate of claim 1 further comprising, after the step of determining which cell the call was placed in, the step of charging the call at a preferential rate upon determining that the call was placed in the private system microcell.

4. The method of determining a charge rate of claim 1 further comprising, after the step of determining whether the private system is operating normally, the step of charging the call at the public rate upon determining that the private system is operating normally.

5. A method of charging for a call from a mobile station which belongs to a private cellular system when the private system is inoperative, said private system operating a microcell which is overlaid by a macrocell in a public cellular system, said method comprising the steps of:

determining that the mobile station placed a call in the public macrocell;

determining whether the private system is inoperative by sending a message from the private system to the public system providing a time period during which the private system was inoperative, said message being sent when the private system becomes operable; and charging for the call at a preferential rate charged for calls in the private system upon determining that the private system is inoperative.

6. The method of charging for a call from a mobile station of claim 5 wherein the private system is connected to a first mobile switching center (MSC) and the public system is connected to a second MSC, and the step of sending a message from the private system to the public system includes sending the message via an interface chosen from the group consisting of:

an extension of IS-41 intersystem signaling protocol;

an X.25 datalink; and a Transaction Control Part/Internet Protocol (TCP/IP) link.

7. A method of charging for a call from a mobile station which belongs to a private cellular system when degraded performance of the private system prevents the mobile station from accessing the private system, said private system operating a microcell which is overlaid by a macrocell in a public cellular system, said method comprising the steps of:

regularly sending a periodic signal from the private system to the public system, said signal reporting whether performance of the private system is degraded;

determining that the mobile station placed a call in the public macrocell;

determining whether the performance of the private system was degraded when the call was placed; and charging for the call at a preferential rate charged for calls in the private system upon determining that the performance of the private system was degraded when the call was placed.

8. The method of charging for a call from a mobile station of claim 7 wherein the private system is connected to a first mobile switching center (MSC) and the public system is connected to a second MSC, and the step of reporting to the public system that performance of the private system is degraded includes sending the message via an interface chosen from the group consisting of:

an extension of IS-41 intersystem signaling protocol;

an X.25 datalink; and a Transaction Control Part/Internet Protocol (TCP/IP) link.

9. A system for determining a charge rate for a call from a mobile station in a cellular telecommunications network in which a public system operates a macrocell which overlays a microcell operated by a private system, said system comprising:

means for reporting whether the private system is operating normally to a mobile switching center (MSC) in the public system, said reporting means regularly sending a periodic signal to the MSC reporting whether the private system is operating normally;

means for sending a charging record from the MSC to a billing center, said charging record including:
a private system status indication (PSSI) which indicates whether the private system is operating normally;
an identity of the mobile station (MSID); and
an identity of a cell where the call is placed (CELLID);

means within the billing center for determining from the MSID whether the mobile station belongs to the private system;

means within the billing center for determining from the CELLID which cell the call was placed in;

means within the billing center for determining from the PSSI whether the private system is operating normally; and means for charging the call at the preferential rate upon determining that the mobile station belongs to the private system, the call was placed in the public macrocell, and the private system is not operating normally.

10. A billing center for determining a charge rate for a call involving a mobile station in a cellular telecommunications network in which a public system operates a macrocell which overlays a microcell operated by a private system, said billing center comprising:

means for receiving a charging record from the public system, said charging record including:
a private system status indication (PSSI) which is automatically inserted in the charging record by the private system to indicate whether the private system is operating normally;
an identity of the mobile station (MSID); and
an identity of a cell where the MS is located (CELLID);

means for determining from the MSID whether the mobile station belongs to the private system;

means for determining from the CELLID which cell the MS was located in during the call;

means for determining from the PSSI whether the private system is operating normally without having to request a private system status report; and means for charging the call at the preferential rate upon determining that the mobile station belongs to the private system, the MS was located in the public macrocell during the call, and the private system is not operating normally.

11. In a billing center, a method of determining a charge rate for a call involving a mobile station in a cellular telecommunications network in which a public system operates a macrocell which overlays a microcell operated by a private system, said method comprising the steps of:

receiving a charging record from the public system, said charging record including:
a private system status indication (PSSI) which is automatically inserted in the charging record by the private system to indicate whether the private system is operating normally;
an identity of the mobile station (MSID); and
an identity of a cell where the MS is located (CELLID);

checking the MSID in the charging record to determine whether the mobile station belongs to the private system;

charging the call at a public rate upon determining that the mobile station does not belong to the private system;

checking the CELLID in the charging record to determine which cell the call was placed in upon determining that the mobile station belongs to the private system;

charging the call at a preferential rate upon determining that the call was placed in the private system microcell;

checking the PSSI in the charging record to determine whether the private system is operating normally upon determining that the call was placed in the public system macrocell, said step of checking the PSSI being performed without having to request a private system status report;

charging the call at the public rate upon determining that the private system is operating normally; and charging the call at the preferential rate upon determining that the private system is not operating normally.

12. The method of claim 11 wherein the step of receiving a charging record from the public system includes receiving the charging record electronically over a datalink.

13. The method of claim 11 wherein the step of receiving a charging record from the public system includes receiving the charging record on a magnetic tape.

14. The method of claim 11 wherein the step of receiving a charging record from the public system includes receiving the charging record on a hard disk.

* * * * *

UNITED STATES PATENT AND TRADEMARK OFFICE
CERTIFICATE OF CORRECTION

PATENT NO. : 6,097,937
DATED : August 1, 2000
INVENTOR(S) : Francois Sawyer

It is certified that error appears in the above-identified patent and that said Letters Patent are hereby corrected as shown below:

Column 1, Line 60, delete "fUils" and substitute -- fails -- therefor.

Signed and Sealed this

Seventeenth Day of April, 2001

Attest:

NICHOLAS P. GODICI

Attesting Officer      Acting Director of the United States Patent and Trademark Office